May 12, 1925.

G. GIANOLI

ANIMAL TRAP

Filed Jan. 30, 1924  3 Sheets-Sheet 1

May 12, 1925.  
G. GIANOLI  
ANIMAL TRAP  
Filed Jan. 30, 1924

G. Gianoli,
INVENTOR

BY Victor J. Evans
ATTORNEY

WITNESSES

May 12, 1925.

G. GIANOLI

ANIMAL TRAP

Filed Jan. 30, 1924 3 Sheets-Sheet 3

G. Gianoli,
INVENTOR

Patented May 12, 1925.

1,537,763

UNITED STATES PATENT OFFICE.

GIACOMO GIANOLI, OF HARTFORD, CONNECTICUT.

ANIMAL TRAP.

Application filed January 30, 1924. Serial No. 689,542.

*To all whom it may concern:*

Be it known that I, GIACOMO GIANOLI, a subject of the King of Italy, residing at Hartford, in the county of Hartford and State of Connecticut, have invented new and useful Improvements in Animal Traps, of which the following is a specification.

This invention relates to improvements in animal traps and has for an object the provision of a trap in which the animal is deposited within a cage or compartment without injury, so that it may be afterwards disposed of in a humane and sanitary manner.

Another object is the provision of an animal trap as above stated, in which the animal enters an open platform compartment, which remains open until the animal reaches the center of the compartment or platform, whereupon the weight of the animal automatically closes the platform compartment entrance to prevent the animal's escape and at the same time releases the platform so that the said animal is deposited into the cage or compartment and the trap automatically reset for future use.

With the above and other objects in view, the invention further includes the following novel features and details of construction, to be hereinafter more fully described, illustrated in the accompanying drawings and pointed out in the appended claims.

In the drawings:—

Figure 1:
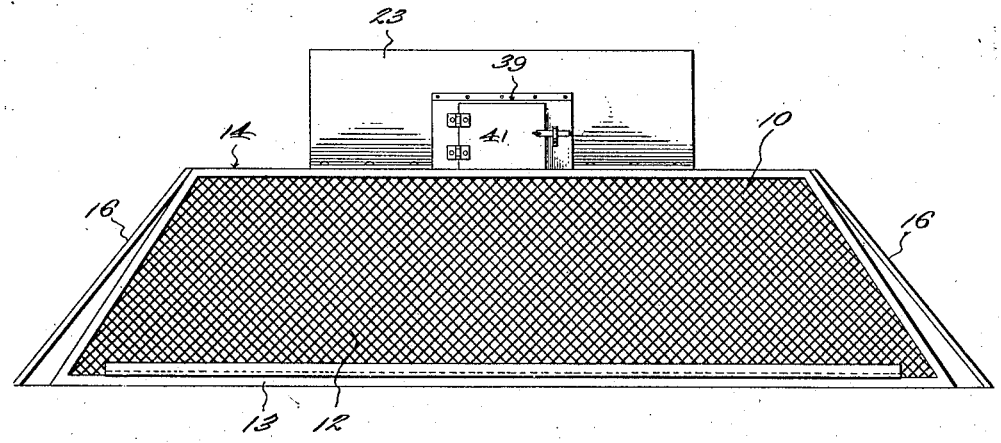
Figure 1 is a side elevation of an animal trap embodying the present invention.
Figure 2:
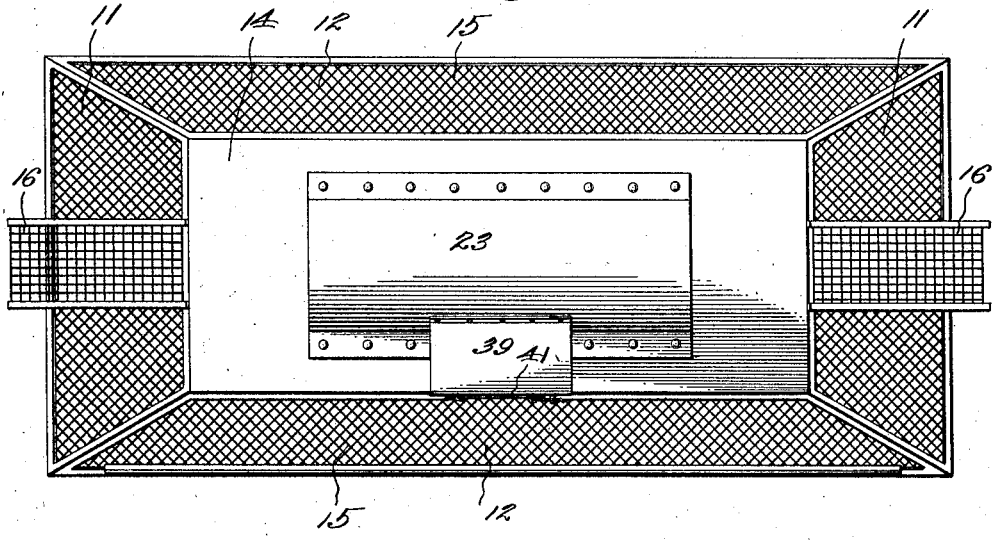
Figure 2 is a plan view of the same.
Figure 3:
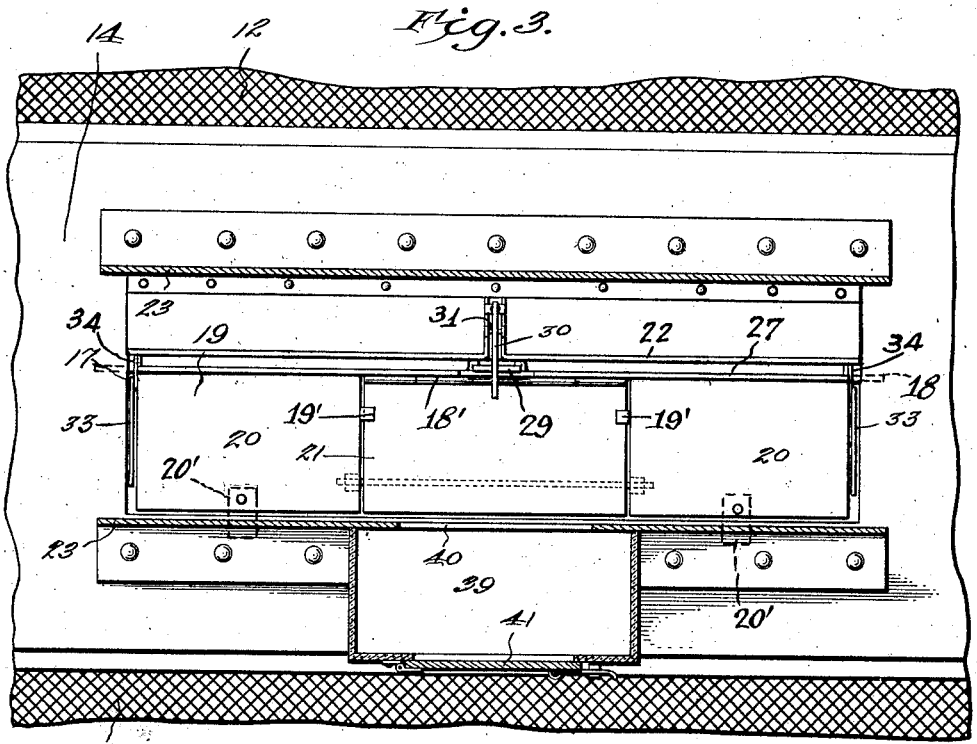
Figure 3 is an enlarged fragmentary horizontal section.
Figure 4:
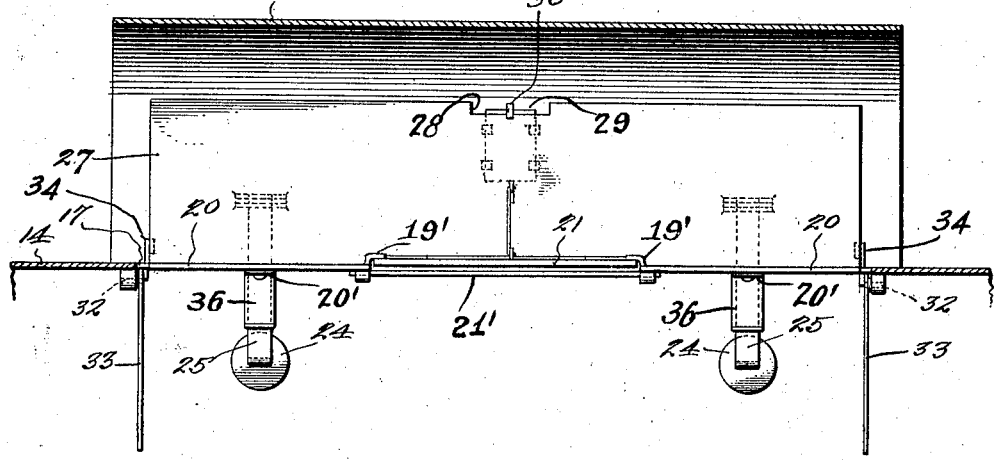
Figure 4 is a fragmentary vertical longitudinal section on the line 4—4 of Figure 5.
Figure 5:
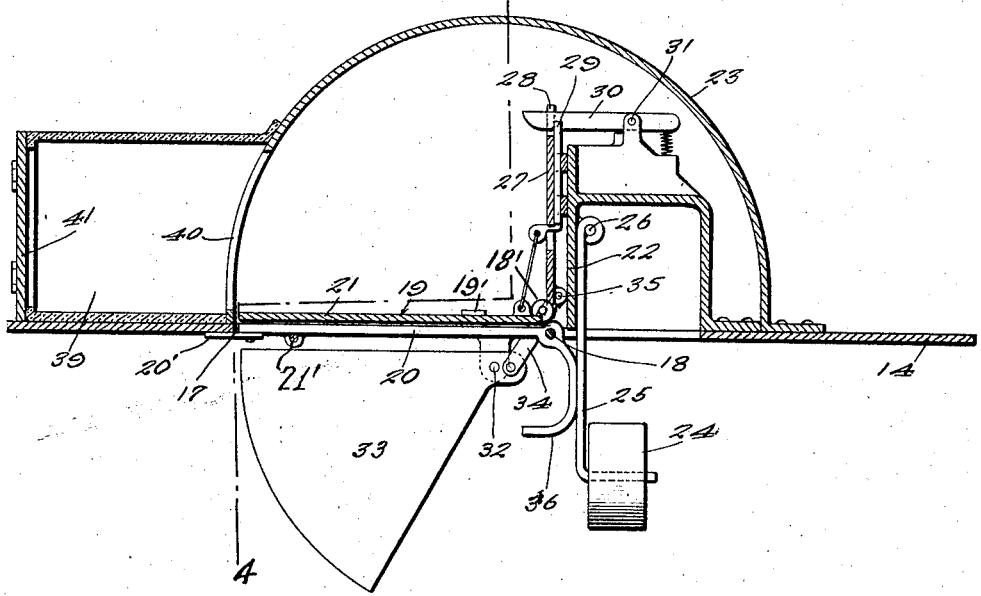
Figure 5 is an enlarged vertical transverse section taken centrally through the upper portion of the trap and showing the platform in normal position.
Figure 6:
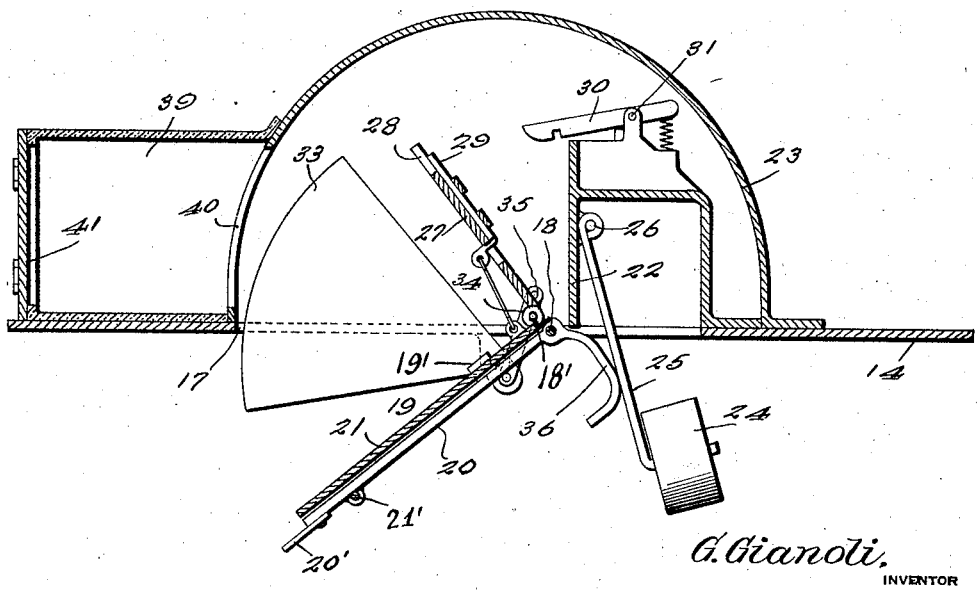
Figure 6 is a similar view with the platform swung downward.

Referring in detail to the drawings, wherein like characters of reference denote corresponding parts, the reference character 10 indicates a cage or compartment which is formed of inclined end walls 11, inclined side walls 12, a bottom 13 and a top 14. The side walls 12 are preferably provided with woven wire panels 15, so that the interior of the cage may be plainly seen and in addition, this woven wire provides means whereby the animal may readily climb to the top of the cage, for a purpose hereinafter apparent. In addition, the end walls 11 are provided with a ladder, herein shown in the form of a strip of woven wire 16, which reaches from the bottom to the top of the cage and provides additional means for the animal to reach the top.

The top 14 of the cage is provided with an opening 17, while pivoted within this opening upon a rod 18 is a platform 19. This platform is of sectional formation and includes end sections 20 and an intermediate section 21, the latter being arranged centrally between and preferably elevated slightly above the top of the end sections. Extending from one edge of the end sections are stops 20' which limit the movement of the end sections in one direction, while extending upwardly adjacent one edge of the platform is a wall 22. The top 14 supports an arched wall 23 which rises upon opposite sides of the opening 17 and extends over the wall 22. For the purpose of automatically raising the platform and normally holding it in raised position, there are provided weights 24 which are carried by one of the ends of arms 25, the latter being pivotally mounted as at 26.

The end sections 20 of the platform have extending upwardly therefrom a wall or flange 27 which is movable with said sections and which abuts the wall 22 when the platform is elevated. This wall 27 is provided with a notch 28 in its upper edge, while mounted for sliding movement at the rear of the wall 27, and having one end extending within the notch 28 is a latch bar 29. The bar 29 is adapted to be engaged by a spring actuated latch 30 and the latter is pivotally mounted as shown at 31.

The section 21 of the platform is hinged to the wall 27 as indicated at 18' and is capable of independent movement, downward movement being limited by a bar 21' which is carried by the section 20, while upward movement is limited by stops 19' which extend from the section 20. Depression of the section 21 will release the latch and permit the entire platform to move downward. Pivotally mounted at each end of the opening 17 as shown at 32 are segmental plates 33, the latter being connected with the wall 27 by means of a link 34. One end of these links is pivoted to the segmental plates 33 while the opposite ends of the links are pivotally connected to the wall 27 as shown at 35. Thus, when the platform is depressed, the plates will be elevated to provide a closure for each end of the platform or the platform compartment which is defined by the arched wall 23. The platform sections are returned to their normal position by means of the weights 24, the latter engaging arms 36 which extend from the end sections of the platform.

In order to initially attract an animal to the trap, there is provided a bait compartment 39 which is located upon the top wall 14 of the trap at one side of the arched wall 23, or at one side of the platform compartment. This bait compartment 39 is provided with foraminous or transparent walls, the inner wall being located over an opening 40 formed in the arched wall 23, so that an animal entering the platform compartment will be enticed inward to the intermediate section 21 of the platform, opposite which the bait compartment 39 is located. The outer end of the bait compartment 39 is open and is provided with a closure 41 so that the bait may be inserted through the opening in this compartment and the closure afterwards positioned to prevent an animal from reaching the bait.

In the operation of the trap, an animal entering either end of the platform compartment in an attempt to reach the bait will pass over the outer sections 20 of the platform. As long as the animal remains upon the platform sections 20, no operation of the platform occurs, but as soon as the weight of the animal is placed upon the intermediate section 21, a limited movement of the section 21 is effected. This limited movement of the intermediate section 21 will cause a sudden pull to be exerted upon the bar 29, which will be released from the latch 30 and permit the entire platform to swing downward under the weight of the animal. As the animal is then in a position substantially central of the ends of the platform, it will be impossible for him to escape, as the lowering of the platform has, through the links 34, raised the segmental plates 33 to close the ends of the platform compartment. An animal is thus deposited within the cage 10.

In order to permit of the removal of the animal from the cage, the bottom 13 may be provided with a normally closed opening.

The invention is susceptible of various changes in its form, proportions and minor details of construction and the right is herein reserved to make such changes as properly fall within the scope of the appended claims.

Having described the invention what is claimed is:—

1. A trap comprising a casing having an opening in the top thereof, a horizontally disposed platform pivotally mounted within and normally closing the opening, a platform compartment supported upon the top of the casing above the platform and open at each end and means including vertically movable pivotally mounted segmental plates located at the ends of the platform compartment and operated by depressing the platform to close said ends.

2. A trap comprising a casing having an opening in the top thereof, a horizontally disposed platform pivotally mounted within and normally closing the opening, a platform compartment supported upon the top of the casing above the platform and open at each end, pivotally mounted plates located at the ends of the platform compartment and links extending from the ends of the platform and engaging the plates to actuate the latter and close the ends of the platform compartment when the platform is depressed.

3. A trap comprising a casing having an opening in the top thereof, a horizontally disposed platform pivotally mounted within and normally closing the opening, a platform compartment supported upon the top of the casing above the platform and open at each end, pivotally mounted plates located at the ends of the platform compartment beneath said platform and means connecting the plates and platform whereby, when the platform is moved downward the plates will be moved upward to close the ends of the platform compartment and vice versa.

In testimony whereof I affix my signature.

GIACOMO GIANOLI.